(12) United States Patent
Jin

(10) Patent No.: US 8,743,146 B2
(45) Date of Patent: Jun. 3, 2014

(54) METHOD AND SYSTEM FOR IMPLEMENTING AUGMENTED REALITY APPLICATION

(71) Applicant: Huawei Device Co., Ltd., Shenzhen (CN)

(72) Inventor: Zhihao Jin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/705,324

(22) Filed: Dec. 5, 2012

(65) Prior Publication Data

US 2013/0093790 A1    Apr. 18, 2013

Related U.S. Application Data

(63) Continuation of application No. PCT/CN2011/073924, filed on May 11, 2011.

(51) Int. Cl.
*G09G 5/00*    (2006.01)

(52) U.S. Cl.
USPC ........................................................ 345/633

(58) Field of Classification Search
CPC ................................................... G06T 19/006
USPC ........................................................ 345/633
See application file for complete search history.

(56) References Cited

U.S. PATENT DOCUMENTS

| 8,104,044 B1* | 1/2012 | Scofield et al. ................ 719/313 |
| 2002/0067372 A1 | 6/2002 | Friedrich et al. |
| 2007/0101279 A1* | 5/2007 | Chaudhri et al. .............. 715/762 |
| 2008/0109483 A1* | 5/2008 | Yoo et al. .................... 707/104.1 |
| 2010/0135527 A1 | 6/2010 | Wu et al. |
| 2011/0055049 A1 | 3/2011 | Harper et al. |
| 2012/0208564 A1* | 8/2012 | Clark et al. ................. 455/456.3 |

FOREIGN PATENT DOCUMENTS

| CN | 101101505 | 1/2008 |
| CN | 101702166 | 5/2010 |
| CN | 101950351 | 1/2011 |

OTHER PUBLICATIONS

Gliet et al., Image Geo-Mashups: The Example of an Augmented Reality Weather Camera; AVI, p. 287-294. ACM Press, (2008).*
Lopez-de-Ipiña et al., A Context-Aware Mobile Mash-Up Platform for Ubiquitous Web; 3rd International Conference on Intelligent Environments, 2007.*
International Search Report issued Feb. 23, 2012 in corresponding International Patent Application No. PCT/CN2011/073924.
Written Opinion of the International Searching Authority issued Feb. 23, 2012 in corresponding International Patent Application No. PCT/CN2011/073924.
Chinese Office Action mailed Feb. 8, 2013 for corresponding Chinese Application No. 201180001452.6.

(Continued)

*Primary Examiner* — Carlos Perromat
(74) *Attorney, Agent, or Firm* — Staas & Halsey LLP

(57) ABSTRACT

The present invention discloses a method and an apparatus for implementing an augmented reality application. The method includes: searching for AR applications related to set AR application parameter; selecting at least two AR applications from multiple AR applications found through searching and integrating the at least two AR applications into one new AR application; and providing the new AR application after integration for a user.

9 Claims, 5 Drawing Sheets

(56) References Cited

OTHER PUBLICATIONS

*Wikitude World Browser Update—Quick Look*, XP055057065, Feb. 23, 2010, pp. 1-4.
*Wikitude for the iPhone—First Look*, XP055057080, Nov. 21, 2009, pp. 1-4.
*Build Mobile Augmented Reality Applications in 1 Hour*; XP055057069, Mar. 14, 2010, pp. 1-5.
*Mozilla Firefox*, XP055057310, Aug. 7, 2010, pp. 1-7.
Extended European Search Report, dated Apr. 25, 2013, in corresponding European Application No. 11777183.2 (8 pp.).

* cited by examiner

# METHOD AND SYSTEM FOR IMPLEMENTING AUGMENTED REALITY APPLICATION

CROSS-REFERENCE TO RELATED APPLICATIONS

This application is a continuation of international Application No. PCT/CN2011/073924, filed on May 11, 2011, which is hereby incorporated by reference in its entirety.

FIELD OF THE INVENTION

The present invention relates to the field of man-machine interaction technology, and in particular to a method and a system for implementing an augmented reality application.

BACKGROUND OF THE INVENTION

An AR (Augmented Reality, augmented reality or augmented reality view) technology is an emerging computer application and man-machine interaction technology developed based on a virtual reality technology. It applies virtual information to the real world with the help of computer and visualization technologies, and a real environment and a virtual object are overlaid in a same image or space and exist simultaneously. To be simple, this is a combination of reality and virtuality. Major application fields include: LBS (Location Based Service, location based service), weather, gaming, distance measuring, advertising, and so on.

Layar is a specific application of the AR technology, and it may connect to the real world through a browser of a mobile phone, and provides retrieval and use of various types of AR content. Specifically, a Layar platform places AR applications on a unified platform for a user to search for and download, where the AR applications are released by an AR content provider on the platform, and are retrieved and downloaded for use by the user through the platform. In this type of application, applications provided by different AR content providers are scattered. The user needs to perform retrieval at all relevant image layers to obtain different AR content. In addition, various types of AR content can only be used separately, and a function of performing multiple augmentations simultaneously on one reality view cannot be fulfilled.

SUMMARY OF THE INVENTION

Embodiments of the present invention provide a method and an apparatus for implementing an augmented reality application, to solve problems in the prior art that a user needs to retrieve different AR content and that performing multiple augmentations simultaneously on one reality view by using various types of AR content cannot be implemented.

To solve the preceding technical problems, the embodiments of the present invention adopt the following technical solutions:

A method for implementing an augmented reality application includes:

searching for AR applications related to set augmented reality AR application parameter selecting at least two AR applications from multiple AR applications found through searching and integrating the at least two AR applications into one new AR application; and providing the new AR application after integration for a user.

An apparatus for implementing an augmented reality application includes:

a searching unit, configured to search for AR applications related to set augmented reality AR application parameter;

a selecting unit, configured to select at least two AR applications for integration from multiple AR applications found by the searching unit;

an integrating unit, configured to integrate the AR applications selected by the selecting unit for integration into one new AR application; and an application providing unit, configured to provide the new AR application after integration for a user.

In the method and apparatus for implementing an augmented reality application according to the embodiments of the present invention, the AR applications related to the set augmented reality AR application parameter are searched for, and the at least two AR applications are selected from the multiple AR applications found through searching and are integrated into one new AR application, thereby providing the new AR application after integration for the user, which implements multiple augmentations simultaneously performed on one reality view by using various types of AR content, and greatly facilitates use by the user.

BRIEF DESCRIPTION OF THE DRAWINGS

To illustrate the technical solutions in the embodiments of the present invention more clearly, accompanying drawings that need to be used in the description of the embodiments are briefly introduced below. Obviously, the accompanying drawings are merely some embodiments of the present invention. Persons of ordinary skill in the art may further obtain other drawings according to these accompanying drawings without making creative efforts.

DETAILED DESCRIPTION OF THE EMBODIMENTS

To help those skilled in the art better understand the solutions in the embodiments of the present invention, the embodiments of the present invention are further described in detail with reference to the accompanying drawings and implementation manners.

Figure 1:
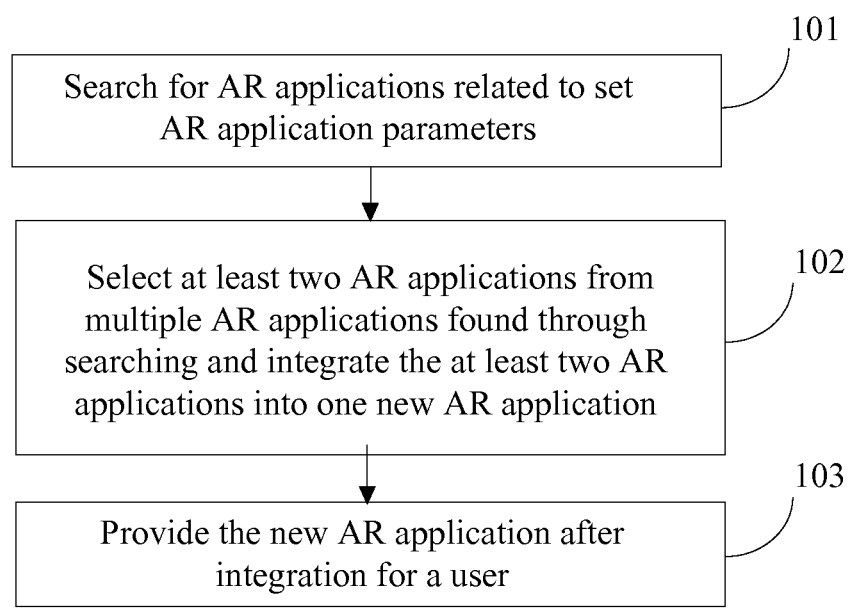
FIG. 1 is a flowchart of an embodiment of a method for implementing an augmented reality application according to the present invention.

FIG. 1 is a flowchart of an embodiment of a method for implementing an augmented reality application according to the present invention, where the method includes the following steps:

Step 101: Search for AR applications related to set AR application parameter.

The foregoing AR application parameter may specifically be set by an AR application developer, and may also be set by a user, which is described in detail in the following.

Search AR applications provided by an AR content provider for AR applications related to the AR application parameter.

Step 102: Select at least two AR applications from multiple AR applications found through searching and integrate the at least two AR applications into one new AR application.

In the foregoing step 101, the AR applications found through searching may be multiple. Therefore, in step 102, part of or all of the AR applications found through searching may be integrated, for example:

If the number of the AR applications found through searching is smaller than a first set number (for example, 3), select all AR applications from the multiple AR applications found through searching and integrate the all AR applications into one new AR application; or, If the number of the AR applications found through searching is larger than or equal to the first set number (for example, 3) and smaller than a second set number (for example, 5), select AR applications, where the number of the AR applications is the first set number, and the AR applications are sorted in top or bottom of the multiple AR applications found through searching, and integrate the AR applications into one new AR application; or, If the number of the AR applications found through searching is larger than the second set number (for example, 5), provide, for the user, a list of the AR applications found through searching, and integrate multiple AR applications selected by the user from the list into one new AR application.

Certainly, other manners may also be adopted to select AR applications for integration from the multiple AR applications found through searching, and are not limited in the embodiments of the present invention.

In the embodiment of the present invention, an AR application includes: AR content and an integration interface. The integration interface may be a unified interface, and may also be a specific interface provided by each AR content provider.

When multiple AR applications are integrated, an interface parameter, such as an integration manner parameter and a list of modifiable functions, may first be obtained according to an integration interface in each AR application; then, according to the obtained interface parameter, AR content and/or an operation on AR content of each AR application is integrated to form one new AR application.

For example, integrating the AR content of each AR application may be: adjusting a position and/or an existence manner of the AR content; integrating the operation on the AR content of each AR application may be: adjusting and/or combining operations on different content.

Certainly, for different AR applications, there may also be other integration manners, which are not limited in the embodiments of the present invention.

Step 103: Provide the new AR application after integration for the user.

For example, the new AR after integration may be released for the user to use, and may also be downloaded by the user to a user terminal for the user to use.

An implementation process of integrating different AR applications in the foregoing step 102 is further described in detail through a specific embodiment below.

Assume that two AR applications, AR application 1 and AR application 2, are found through searching. A process for integrating AR application 1 and AR application 2 is as follows:

(1) Use a Get_Integration function to separately read integration interfaces of AR application 1 and AR application 2, and separately obtain integration manner parameter and lists of modifiable functions of the foregoing two AR applications.

Get_integration(Handle(AR application 1)); return of this read operation is two variable definition sets: IntParas1 and IntMethods1

```
IntParas1 //a parameter set (content irrelevant to the example is omitted)
    { Integrable = 1, //integration may be performed
        Init = 1,//trigger manner of this AR application: triggered
when an integrated application is started
            InitMethod = Handle(InitMethod1_0)// indicates
that an IntMethod1_0 function is used to start AR application 1
        End = 2,// ending manner of this AR application: end
this AR application through a user operation
            Content = 1, //existence manner: co-existence is allowed
            C_Trans = MAX, //value of transparency during
co-existence is MAX, namely, opaque
            C_Size = (100,20)//size of this AR content is 100
            in length, and 20 in height
            C_Pos = Handle(IntMethod1_1(x,y))// indicates that
            an IntMethod1_1
function is used to modify a position of AR content
            C_Zoom = Handle(IntMethod1_2(Zoom)) indicates that
an IntMethod1_2 function is used to modify zooming of AR content
            C_Trans = Handle(IntMethod1_3(Trans)) indicates that
an IntMethod1_3 function is used to modify transparency of AR content
    }
    IntMethods1
    {
        InitMethod1_0
        IntMethod1_1(x,y)
        IntMethod1_2(Zoom)
        IntMethod1_3(Trans)
    }
```

Likewise, by using Get_Integration(Handle(AR application 2)) to read an integration interface of AR application 2, an integration manner parameter and a list of modifiable functions of AR application 2 may also be read, which is not repeatedly described here.

It should be noted that, an integration interface of an AR application is described by using a form of variable definition set, and certainly, other manners may also be adopted. For example, the integration interface of the AR application is described by adopting manners such as an XML (Extensible Markup Language, extensible markup language) file.

(2) According to a read integration manner parameter and list of modifiable functions of each AR application, determine a modification operation that needs to be performed.

For example, the following integration operating function Cal((IntParas1, IntMethods1),(IntParas2,IntMethods2)) is used to implement the modification operation that needs to be performed.

This function outputs a function call list, which is as shown in the following (content irrelevant to the example is omitted):

```
CalResult
{
    1: NewInit =(InitMethod1_0 + InitMethod2_0)//indicates that
both AR application 1 and AR application 2 are triggered after the
integrated application is started.
    2: IntMethod1_1(0,0)//indicates that a position of AR content
of AR application 1 is placed at coordinates (0,0).
    3: IntMethod1_2(100)//indicates that zooming is 100% of an
original size, namely, not changed.
```

4: IntMethod2__1(0,25)//indicates that a position of AR content of AR application 2 is placed at coordinates (0,25). Because height of the content of AR application 1 is 20, this operation arranges the content of the two applications vertically.

5:3: IntMethod2__2(100)//indicates that zooming is 100% of the original size, namely, not changed.
}

The foregoing displayed position of the AR content belongs to a domain of UI control. Therefore, the adjusting the position of the AR content belongs to an adjustment to the UI of the AR application.

For another example, assume that two AR applications cannot co-exist, and AR application 2 is started only after AR application 1 is ended, then AR application 1 needs to provide a corresponding modifiable function, for example, EndMethod1_1(End_Sig). When AR application 1 and AR application 2 are integrated, this function is called, so that an End_Sig signal is sent after AR application 1 is ended. Meanwhile, AR application 2 provides a modifiable function InitMethod2_1(Init_Sig). This function is called, so that AR application 2 uses an Init_Sig signal as a trigger condition for a start.

The following integration operating functions EndMethod1_1(End_Sig) and InitMethod2_1(Init_Sig) are used to implement the modification operation that needs to be performed.

Interface parameter in AR application 1 include (content irrelevant to the example is omitted):

IntPara1
{
    Init = 1,//trigger manner of this AR application: triggered when an integrated application is started
        InitMethod = Handle(InitMethod1__0)// indicates that an IntMethod1_0 function is used to start AR application 1
    End = 2,// ending manner of this AR application: end this AR application through a user operation
        EndMethod = Handle(EndMethod1__1 (End__Sig))//indicates that this function is automatically called when this AR application ended.
    ......
}

Interface parameter in AR application 2 include (content irrelevant to the example is omitted):

IntPara1
{
    Init = 3,//trigger manner of this AR application: triggered by a start signal
        InitMethod = Handle(InitMethod2__1(Init__Sig))// indicates that an IntMethod2__1(Init_Sig) function is used to start AR application 2
    End = 2,// ending manner of this AR application: end this AR application through a user operation
    ......
}

According to the foregoing parameter of the two applications, a result of the integration operating function is as follows:

CalResult
{
    1:NewInit = InitMethod1__0 //indicates that application 1 is started when the integrated application is started
    2:EndMethod1__1(End1)//indicates that an End1 message is sent after application 1 is ended
    3:InitMethod2__1(End1)//indicates that the End1 message starts application 2
}

The foregoing trigger manner of the AR content belongs to a domain of middleware control. Therefore, the adjusting the trigger manner of the AR content belongs to an adjustment to the middleware of the AR application.

(3) According to a function operation result obtained in the preceding step, modifiable functions in the integration interfaces are called in sequence to accordingly modify the two AR applications separately, and the AR content of the two AR applications, and a user interface after modification and/or middleware after modification are compressed to generate one new AR application.

In this way, after being started, the AR application after integration performs normal program calling when it is running, and calls the middleware after integration according to the user interface after integration to complete use of an integrated AR application.

It may be seen that, in the method for implementing an augmented reality application according to the embodiment of the present invention, the user does not need to perform retrieval by itself in massive AR applications, and, multiple AR applications found through searching are automatically integrated into one new AR application and the new AR application is provided for the user, which implements multiple augmentations simultaneously performed on a reality view by using various types of AR content, and greatly facilitates use by the user.

As mentioned above, the AR application parameter in step 101 may be specifically set by the AR application developer, and may also be set by the user.

For example, the AR application developer may set the foregoing AR application parameter by itself, so that integration is performed in various different manners for AR applications provided by different AR content providers, and multiple AR applications with richer content are provided for the user, thereby meeting different needs of the user.

In this case, the AR application parameter at least include: an AR integration mode, where the AR integration mode includes any one or multiple items of the following: a regular integration mode, a same developer mode, and a same theme mode.

The regular integration mode refers to a mode of a latest AR application set similar to a fantasy game style;

The same developer mode refers to a mode of integrating AR applications provided by a same AR content provider;

The same theme mode refers to a mode of integrating AR applications that provide a same type of information.

In this way, the AR application developer may release the AR application after integration for a user to use, and the user does not need to retrieve different AR content, thereby implements multiple augmentations simultaneously performed on a reality view by using various types of AR content.

For another example, the foregoing AR application parameter may also be set by the user. Relevant AR applications are searched for according to AR application parameter set by the user, and are integrated to meet customization needs of the user.

Figure 2:
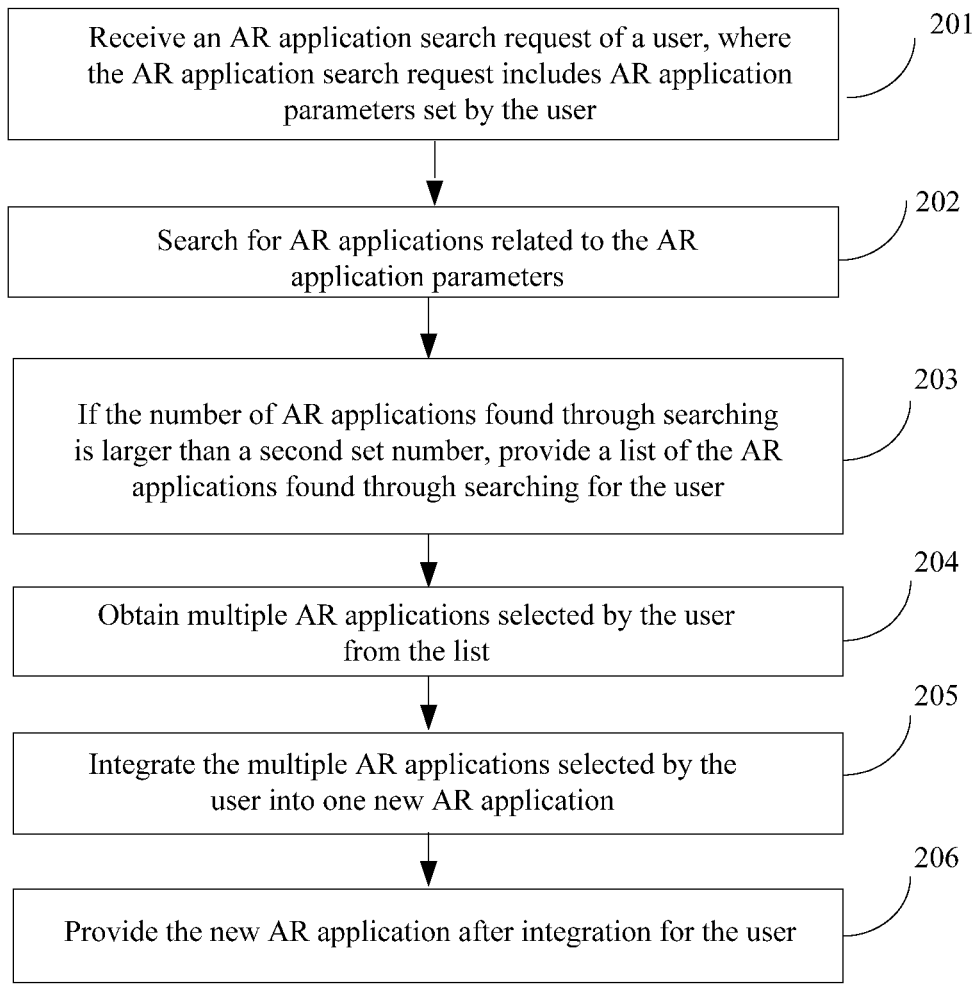
FIG. 2 is a flowchart of another embodiment of a method for implementing an augmented reality application according to the present invention.

FIG. 2 is a flowchart of another embodiment of a method for implementing an augmented reality application according to the present invention, where the method includes the following steps:

Step 201: Receive an AR application search request of a user, where the AR application search request includes AR application parameter set by the user.

The foregoing AR application parameter may include an AR integration mode, and may also include information such as some keywords and features of AR content. For example:

AR application parameter of an AR application search request input by user A includes: time: first quarter in 2009; score: larger than 4; receive integration advertisement: agree.

AR application parameter of an AR application search request input by user B includes: category: food and beverage; time: not limited; receive integration advertisement: not agree.

Certainly, in a specific application, specific content of the foregoing AR application parameter is not limited in the embodiments of the present invention, and may be determined according to an application need.

Step 202: Search for AR applications related to the foregoing AR application parameter.

After the AR application search request of the user is received, according to the AR application parameter in it, search AR applications provided by an AR content provider for AR applications related to the AR application parameter.

Step 203: If the number of AR applications found through searching is larger than a second set number (for example, 5), provide, for the user, a list of the AR applications found through searching.

For example, the list of the AR applications found through searching may be sorted for display according to the number of downloads or a score value. Displayed content may include: a name of an AR application, the number of downloads, a score value, and so on. Certainly, other display manners may also be adopted.

Step 204: Obtain multiple AR applications selected by the foregoing user from the foregoing list.

Step 205: Integrate the multiple AR applications selected by the user into one new AR application.

In the embodiment of the present invention, an AR application includes: AR content and an integration interface. This integration interface may be a unified interface, and may also be a specific interface provided by each AR content provider.

Reference may be made to the foregoing description for a specific process of integrating multiple AR applications into one new AR application, and details are not repeatedly described here.

Step 206: Provide the new AR application after integration for the foregoing user.

It should be noted that, the foregoing step 203 and step 204 are optional steps, that is to say, after the AR applications related to the foregoing AR application parameter are found through searching, part of or all of these AR applications may be directly integrated, and a new AR application after integration is provided for the user.

In addition, if the number of AR applications found through searching in step 202 is smaller than or equal to the second set number, selection by the user may not be needed.

In addition, if the user quits the selection, first several applications in the list may be selected for integration according to a default sorting manner.

In the method for implementing an augmented reality application in this embodiment, AR applications that meet a user's need may be searched for according to the AR application search request of the user, AR applications for integration are selected from them, multiple selected AR applications are automatically integrated into one new AR application, and the new AR application is provided for the user, which implements multiple augmentations simultaneously performed on a reality view by using various types of AR content, so that the user does not need to perform retrieval by itself in massive AR applications, and use by the user is greatly facilitated.

Further, after the AR applications that meet the user's need are found through searching according to the AR application search request of the user, a list of these AR applications is provided for the user, so that the user may make further selection for AR applications that take part in the integration, thereby meeting the user's need more accurately.

It should be noted that, in each of the foregoing embodiments, to further facilitate release and application of AR content by each AR content provider, a unified API (Application Programming Interface, application programming interface) used for producing an AR application may be further provided, so that the AR content provider produces an AR application according to the API.

The foregoing API used for producing an AR application may include any one or multiple items of the following interface parameter: integration availability, an AR application trigger manner, an AR application ending manner, and an allowed existence manner for a current AR application in a case of multiple AR applications. Certainly, if needed, other interface parameter may also be included, and the embodiments of the present invention are not limited to any particular interface parameters.

Each of the foregoing interface parameter are further described separately below.

1. Integration availability, optional values of which are: (1) allow; (2) not allow;

2. AR application trigger manner, optional values of which are: (1) Triggered when an integrated application is started. That is, after an AR application after integration is started, AR content in this AR application is triggered;

(2) Triggered upon a user operation. That is, in an AR application after integration, a specific user operation (for example, a touch screen point or entity key) triggers AR content in this AR application;

(3) Triggered by a previous application. That is, in an AR application sequence after integration, a specific operation (for example, a touch screen point) in an AR application prior to this AR application triggers AR content in this AR application;

(4) Triggered upon end of a previous application. That is, in an AR application sequence after integration, AR content in this AR application is triggered after AR content in an AR application prior to this AR application ends.

3. AR application ending manner, optional values of which are:

(1) End of an integrated application;

(2) User operation;

(3) Start of a next application.

4. Allowed existence manner of a current AR application in a case of multiple AR applications, optional values of which are:

(1) Transparent manner. That is, AR content of a current AR application exists in transparency given by the API. It is totally visible when the transparency is MAX. An interface for adjusting an AR content position needs to be provided;

(2) Hidden manner. That is, current AR content is invisible;

(3) Image layer movement manner. That is, an image layer of a current AR moves upwardly or downwardly to block or be blocked by another image layer.

It should be noted that, the foregoing interface parameter and their optional values are merely some examples; in a specific application, setting of each interface parameter may be determined according to an application need, and is not limited in the embodiments of the present invention.

In this way, the AR content provider may produce AR content and an integration interface according to a regulation of the unified API. For example: a certain AR content provider defines an integration interface of AR advertisement software provided by it as follows:

AR integration=allow;
AR trigger manner=end of a previous application;
AR ending manner=user operation;
AR co-existence mode=display+upward movement of an image layer.

Certainly, the AR content provider may also produce an AR application according to another API. As long as the AR content provider can provide an API of the AR application when providing the AR application, the AR application may also be integrated according to the method for implementing an augmented reality application in the embodiments of the present invention, thereby meeting a user's need to simultaneously perform multiple augmentations on a reality view by using various types of AR content.

It may be known from the description of the preceding implementation manners that, those skilled in the art may clearly understand that part of or all of the steps in the method provided in the foregoing embodiments may be implemented by using a manner of software plus a necessary general hardware platform. Based on such understanding, the nature of the technical solutions in the present invention, or in other words, part that makes contributions to the prior art may be embodied in a form of a software product. This computer software product may be stored in a storage medium, such as a ROM/RAM, a magnetic disk, and a compact disk, and includes several instructions that are used for enabling a computer device (which may be a personal computer, a server, or a network device and so on) to execute the method provided in each embodiment or certain parts of the embodiments of the present invention.

For example, through a unified API which is provided by an AR platform and is for producing AR applications, a user may search for, view, and download an AR application through this AR platform, and an AR content provider may upload an AR application to the AR platform.

Figure 3:
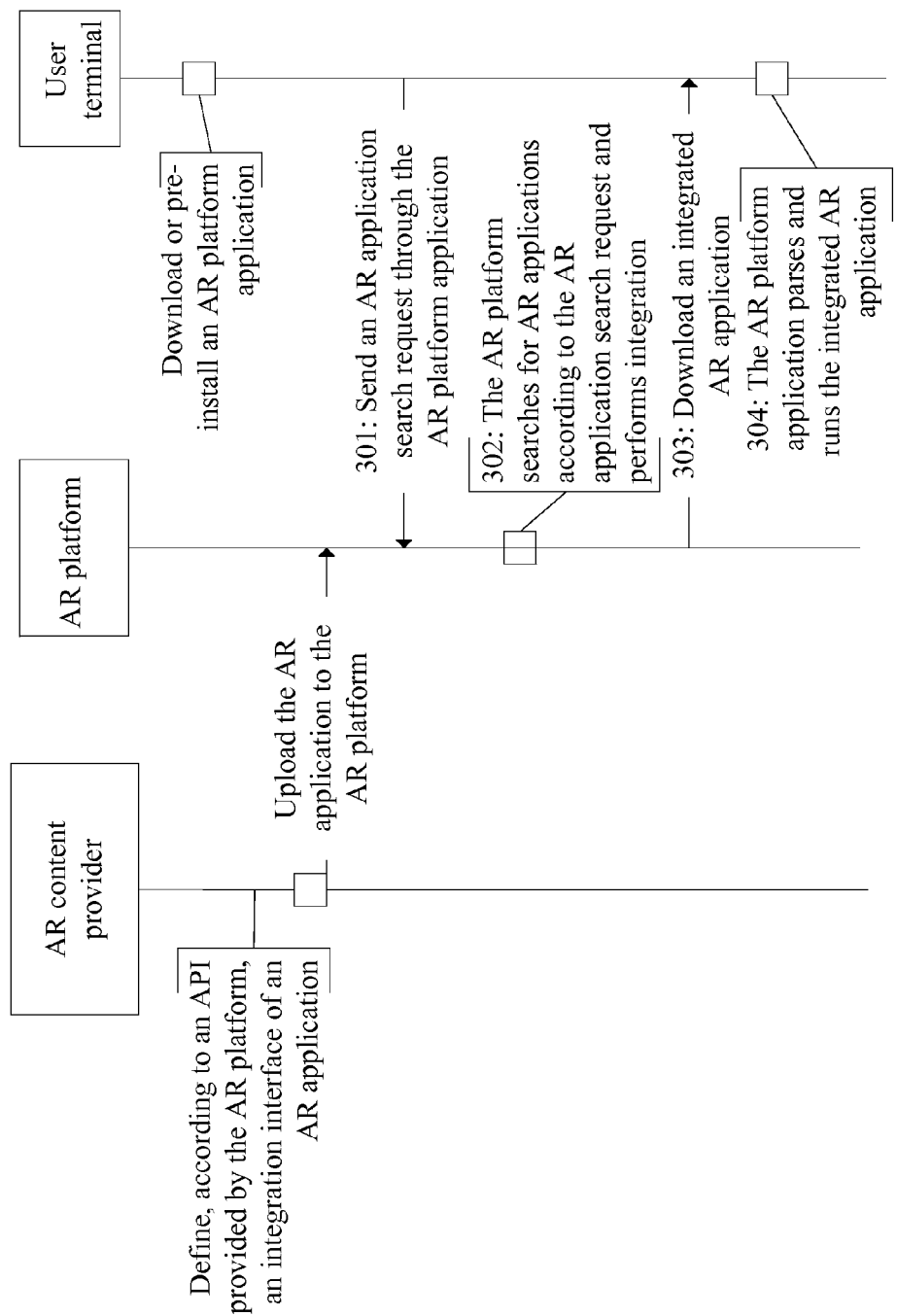
FIG. 3 is a schematic diagram of an AR platform that applies a method for implementing an augmented reality application according to an embodiment of the present invention, and its implementation of AR application integration.

FIG. 3 is a schematic diagram of an AR platform that applies a method for implementing an augmented reality application according to an embodiment of the present invention, and its implementation of AR application integration.

In this application example, a user terminal needs to first download or pre-install an AR platform application. An AR platform provides a unified API for producing an AR application. An AR content provider may define, according to the API provided by the AR platform, an AR application integration interface, and upload a produced AR application to the AR platform.

A process of using, by a user, AR content provided by the AR content provider, by using the AR platform application is as follows:

Step 301: A user terminal sends an AR application search request through an AR platform application to an AR platform, where the AR application search request includes AR application parameter set by a user.

Step 302: After receiving the foregoing AR application search request, the AR platform searches for AR applications and performs integration.

Specifically, the AR platform, according to the AR application parameter included in the AR application search request, searches for AR applications related to the foregoing AR application parameter, and integrates the AR applications found through searching. The AR applications that take part in the integration may be part of or all of the AR applications in the AR applications found through searching.

As mentioned above, an AR application includes: AR content and an integration interface. The AR platform may integrate, according to the AR application parameter set by the user (for example, a feature of the AR content) and an integration interface in an AR application, AR content in the multiple AR applications found through searching into an image layer to form one new AR application.

Certainly, the AR platform may also first provide, for the user, a list of the AR applications found through searching, so that the user selects AR applications that may be used for integration.

Step 303: The user terminal downloads an integrated AR application.

Step 304: The AR platform application parses and runs the integrated AR application.

It should be noted that, when an AR application that complies with an AR development specification is used separately, the AR platform may provide support of a basic engine. The AR platform application may merely provide a code above the basic engine.

Certainly, an AR application developer may also use the foregoing AR platform to implement integration of multiple AR applications to provide AR applications with richer content for the user, thereby meeting multiple needs of the user.

By using the method for implementing an augmented reality application according to the embodiments of the present invention, integration of AR applications in multiple fields may be implemented, which is described below with an example.

For example: Real estate agent A and real estate agent B both provide house quotation applications that are based on an AR technology in the present invention. Both applications can display brief information and a quotation of a house, a reality view of which is shot by a mobile phone, and provide integration interfaces that comply with specifications for integrating the AR platform to use. The integration interfaces provided by both applications identify that both are triggered upon a start of an integrated AR application, co-exist, exist in transparency MAX, and provide position adjustment interfaces that may adjust a user interface to four corners of a house image.

When a user needs an AR application of a house category, the user selects needed AR applications of the house category. According to selection of the user, the AR platform finds, by searching, the AR applications released by real estate agent A and real estate agent B, and integrates two AR applications according to an integration interface provided by each AR application to form a house price comparison application. During an integration process, user interfaces of the two AR applications are adjusted to upper left and lower left display of the house image. Display on the user interfaces is triggered through a click on the house image. Then, the integrated AR application is provided for the user.

The user downloads and uses the integrated AR application. The user may perform, through this AR application, price comparison on houses provided by different real estate agents.

Accordingly, an embodiment of the present invention further provides an apparatus for implementing an augmented reality application, which can automatically implement multiple augmentations simultaneously performed on a reality view by using various types of AR content.

Figure 4:
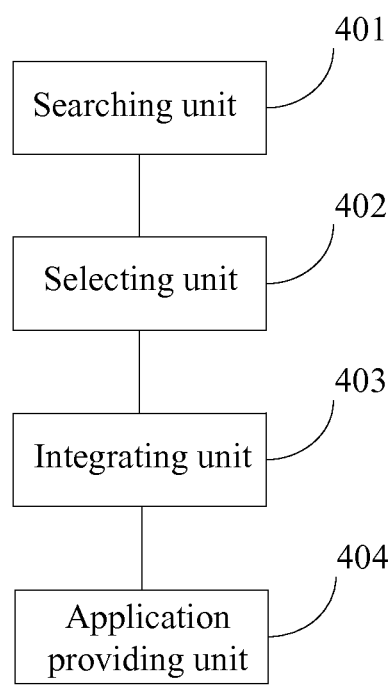
FIG. 4 is a schematic diagram of an embodiment of an apparatus for implementing an augmented reality application according to the present invention.

FIG. 4 is a schematic diagram of an embodiment of an apparatus for implementing an augmented reality application according to the present invention.

In this embodiment, the apparatus for implementing an augmented reality application includes: a searching unit 401, a selecting unit 402, an integrating unit 403, and an application providing unit 404.

The searching unit 401 is configured to search for AR applications related to set augmented reality AR application parameter.

The selecting unit 402 is configured to select at least two AR applications for integration from multiple AR applications found through searching by the searching unit 401.

The integrating unit 403 is configured to integrate the AR applications selected by the selecting unit 402 for integration into one new AR application.

The application providing unit 404 is configured to provide the new AR application after integration for a user.

The foregoing AR application parameter may be set by an AR application developer, and may also be set by the user. Reference may be made to the preceding description. Specific content of the foregoing AR application parameter is not limited in the embodiments of the present invention, and may be determined according to an application need. The searching unit 401 may search, according to the foregoing AR application parameter, AR applications provided by an AR content provider for AR applications related to the AR application parameter. The AR applications which are found through searching by the searching unit 401 and are related to the AR application parameter may be multiple. Each of the AR applications may include: AR content and an integration interface. The integration interface may be a unified interface, and may also be a specific interface provided by each AR content provider.

In an actual application, the AR applications found through searching by the searching unit 401 may be multiple. Therefore, the selecting unit 402 may select part of or all of the AR applications for integration from them. For example, the selecting unit 402 includes at least one of the following:

a first selecting subunit, configured to: if the number of the AR applications found through searching by the searching unit 401 is smaller than a first set number (for example, 3), select, by the selecting unit 402, all AR applications for integration from the multiple AR applications found through searching; or, a second selecting subunit, configured to: if the number of the AR applications found through searching by the searching unit 401 is larger than or equal to a first set number (for example, 3) and smaller than a second set number (for example, 5), select, by the selecting unit 402, AR applications for integration, where the number of the AR applications is the first set number, and the AR applications are sorted in top or bottom of the multiple AR applications found through searching; or, a third selecting subunit, configured to: if the number of the AR applications found through searching by the searching unit 401 is larger than a second set number (for example, 5), provide, by the selecting unit 402 and for the user, a list of the AR applications found through searching, and use multiple AR applications selected by the user from the foregoing list for integration.

Certainly, other methods may also be adopted to select AR applications for integration from the multiple AR applications found through searching by the searching unit 401, which is not limited in the embodiments of the present invention.

In the embodiment of the present invention, a specific implementation structure of the integrating unit 403 includes: an interface parameter obtaining subunit (not shown in the figure), and further includes: a content integrating subunit (not shown in the figure), and/or an operation integrating subunit (not shown in the figure).

The foregoing interface parameter obtaining subunit is configured to obtain an interface parameter according to an integration interface in each AR application.

The foregoing content integrating subunit is configured to perform integration on AR content of each AR application according to the interface parameter.

The foregoing operation integrating subunit is configured to perform integration on an operation of the AR content of each AR application according to the interface parameter.

It may be seen that, with the apparatus for implementing an augmented reality application according to the embodiment of the present invention, the user does not need to perform retrieval by itself in massive AR applications, and the at least two AR applications in multiple AR applications found through searching are automatically integrated into one new AR application and the new AR application is provided for the user, which implements multiple augmentations simultaneously performed on a reality view by using various types of AR content, and greatly facilitates use by the user.

Figure 5:
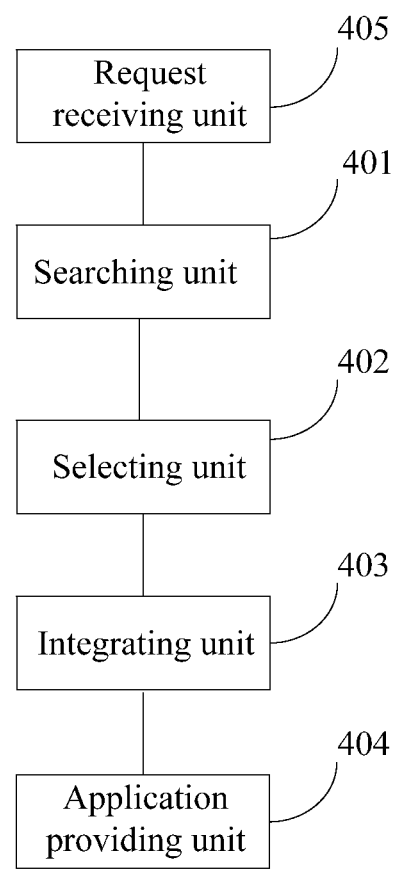
FIG. 5 is a schematic diagram of another embodiment of an apparatus for implementing an augmented reality application according to the present invention.

FIG. 5 is a schematic diagram of another embodiment of an apparatus for implementing an augmented reality application according to the present invention.

What is different from that shown in FIG. 4 is that, the apparatus for implementing an augmented reality application according to this embodiment, optionally, further includes: a request receiving unit 405. The request receiving unit 405 is configured to receive an AR application search request of a user, where the AR application search request includes AR application parameter set by the user. Accordingly, in this embodiment, when the number of AR applications found through searching by a searching unit 401 exceeds a second set number, a selecting unit 402 provides a list of the AR applications found through searching by the searching unit 401 for the user, and uses multiple AR applications selected by the foregoing user from the foregoing list for integration. An integrating unit 403 integrates the multiple AR applications selected by the user into one new AR application.

It should be noted that, if the user quits the selection, the selecting unit 402 fails to obtain the multiple AR applications selected by the user from the list, the integrating unit 403 may also integrate first several applications in the list for integration according to a default sorting manner.

With the apparatus for implementing an augmented reality application in this embodiment, AR applications that meet a user's need may be searched for according to the AR application search request of the user, at least two AR applications in multiple AR applications found through searching are automatically integrated into one new AR application, and the new AR application is provided for the user, which implements multiple augmentations simultaneously performed on a reality view by using various types of AR content, so that the user does not need to perform retrieval by itself in massive AR applications, and use by the user is greatly facilitated.

Further, after the AR applications that meet the user's need are found through searching according to the AR application search request of the user, a list of these AR applications is provided for the user, so that the user may make further selection for AR applications that take part in the integration, thereby meeting the user's need more accurately.

To facilitate release and application of AR content by various AR content provider, in the foregoing embodiments shown in FIG. 4 and FIG. 5, optionally, the following may be further included: an interface information providing unit (not shown in the figure), configured to provide a unified API for producing an AR application, so that an AR content provider produces an AR application according to the API.

The foregoing API for producing an AR application may include any one or multiple items of the following interface parameter: integration availability, an AR application trigger manner, an AR application ending manner, and an allowed existence manner for a current AR application in a case of multiple AR applications. Certainly, if needed, other interface parameter may also be included, and are not limited in the embodiments of the present invention.

By using the method and apparatus for implementing an augmented reality application according to the embodiments of the present invention, integration of AR applications in multiple fields may be implemented. By applying the method and apparatus to a server end of an AR platform, a user's need of integration is obtained through an application of the AR platform at a mobile terminal, multiple corresponding AR applications are integrated at the server end, and an overall function of AR applications is enhanced, thereby attracting more developers to development of AR applications, and improving a control capability of a platform side for applications.

In another aspect, for an AR content provider, because an AR advertisement is different from an ordinary embedded advertisement, a basic engine provided by an AR platform is called. Through integration of AR applications, a favorable promotion approach is provided for the AR advertisement, so that the AR advertisement can be promoted more smoothly.

In another aspect, for a user, a downloading charge of the user may be reduced through integration. In addition, integration of AR applications of a same type also facilitates comparison of different information sources of same content by the user, yielding favorable practical values.

It should be noted that, each embodiment in the specification is described in a progressive manner. Reference may be made to each others for parts that are the same or similar between the embodiments. The description of each embodiment focuses on a difference from other embodiments. Particularly, the description of the apparatus embodiments is relatively simple because they are basically similar to the method embodiments, and reference may be made to part of the description in the method embodiments for relevant description. The preceding described apparatus embodiments are merely exemplary, where the units that are described as separate components may or may not be physically separated, and the components displayed as units may or may not be physical units, and may be located in one place, or may also be scattered on multiple network units. Part of or all of the modules may be selected according to an actual need to accomplish the purposes of the solutions in the embodiments. Persons of ordinary skill in the art may understand and implement the solutions without making creative efforts.

The foregoing description is merely exemplary embodiments of the present invention, but not intended to limit the protection scope of the present invention. Any modification, equivalent replacement, and improvement made without departing from the spirit and principle of the present invention shall fall within the protection scope of the present invention.

What is claimed is:

1. A method of implementing an augmented reality application, comprising:
searching for AR applications related to set augmented reality (AR) application parameter based on an input;
selecting at least two AR applications from multiple AR applications found to be related to the set AR application parameter through the searching, and integrating the at least two AR applications selected into one new AR application in accordance with an interface parameter defined for the at least two AR applications; and
providing the new AR application formed by the at least two AR applications for a user, and
wherein the selecting and integrating include one of:
selecting all AR applications in the multiple AR applications found through searching and integrating into the one new AR application, when a number of the AR applications found through searching is smaller than a first set number;
selecting AR applications, wherein the AR applications are sorted in top or bottom of the multiple AR applications found through searching, and integrating the AR applications into the one new AR application, when the number of the AR applications found through searching is larger than or equal to the first set number and smaller than a second set number; and
providing, for the user, a list of the AR applications found through searching, and integrating multiple AR applications selected by the user from the list into the one new AR application, when the number of the AR applications found through searching is larger than the second set number.

2. The method according to claim 1, wherein the AR applications comprise AR content and an integration interface,
the selecting and the integrating comprises:
obtaining interface parameter from integration interfaces of the AR applications used for integration; and
performing integration on AR content and/or an operation on AR content of each AR application according to the interface parameter to form the one new AR application.

3. The method according to claim 2, wherein:
the performing integration on AR content of each AR application comprises: adjusting a position and/or an existence manner of the AR content;
the performing integration on an operation on AR content of each AR application comprises: adjusting and/or combining operations on different content.

4. The method according to claim 1, wherein the set AR application parameter includes an AR integration mode identifying at least one of a same developer mode, and a same theme mode.

5. The method according to any one of claim 1, further comprising:
receiving an AR application search request of the user, wherein the AR application search request comprises the set AR application parameter; and/or,
providing a unified application programming interface (API) for producing an AR application, so that an AR content provider produces an AR application according to the API.

6. The method according to claim 5, wherein the API for producing an AR application comprises any one or multiple items of the following interface parameter:

integration availability, an AR application trigger manner, an AR application ending manner, and an allowed existence manner for a current AR application in a case of multiple AR applications;

the AR application trigger manner comprises any one or multiple of the following: trigger when an integrated application is started, trigger upon a user operation, triggered by a previous application, and trigger upon end of a previous application;

the allowed existence manner for a current AR application in a case of multiple AR applications comprises any one or multiple of the following: a transparency manner, a hidden manner, and an image layer movement manner.

7. An apparatus of implementing an augmented reality application, comprising:

a computer communicating with:

a searching unit, configured to search for AR applications related to set augmented reality (AR) application parameter based on an input;

a selecting unit, configured to select at least two AR applications for integration from multiple AR applications found to be related to the set AR application parameter through the search by the searching unit;

an integrating unit, configured to integrate the AR applications selected by the selecting unit into one new AR application in accordance with an interface parameter defined for the at least two AR applications; and an application providing unit, configured to provide the new AR application formed by the at least two AR applications for a user, and wherein the selecting unit includes at least one of the following:

a first selecting subunit, configured to select all AR applications for integration from the multiple AR applications found through searching when a number of the AR applications found through searching is smaller than a first set number;

a second selecting subunit, configured to select AR applications for integration, wherein the AR applications are sorted in top or bottom of the multiple AR applications found through searching when the number of the AR applications found through searching is larger than or equal to the first set number and smaller than a second set number;

a third selecting subunit, configured to provide, for the user, a list of the AR applications found through searching, and use multiple AR applications selected by the user from the list for integration when the number of the AR applications found through searching is larger than the second set number.

8. The apparatus according to claim 7, wherein the AR application comprises AR content and an integration interface; and the integrating unit comprises:

an interface parameter obtaining subunit, configured to obtain interface parameter from integration interfaces of the AR applications used for integration;

a content integrating subunit, configured to perform, according to the interface parameter, integration on AR content of the AR applications used for integration; and an operation integrating subunit, configured to perform, according to the interface parameter, integration on an operation on AR content of the AR applications used for integration.

9. The apparatus according to claim 7, wherein the apparatus further comprises at least one of the following:

a request receiving unit, configured to receive an augmented reality AR application search request of the user, wherein the AR application search request comprises the set AR application parameter; and an interface information providing unit, configured to provide a unified application programming interface (API) for producing an AR application, so that an AR content provider produces an AR application according to the API.

* * * * *